United States Patent
Kaas (10) Patent No.: US 10,677,371 B2
(45) Date of Patent: Jun. 9, 2020

(54) CONTROL VALVE, IN PARTICULAR FOR USE IN COOLING PATHS

(71) Applicant: GEVA AUTOMATION GMBH, Aachen (DE)

(72) Inventor: Burkhard Kaas, Aachen (DE)

(73) Assignee: GEVA AUTOMATION GMBH, Aachen (DE)

( * ) Notice: Subject to any disclaimer, the term of this patent is extended or adjusted under 35 U.S.C. 154(b) by 38 days.

(21) Appl. No.: 16/073,432

(22) PCT Filed: Jan. 20, 2017

(86) PCT No.: PCT/EP2017/051232
§ 371 (c)(1),
(2) Date: Jul. 27, 2018

(87) PCT Pub. No.: WO2017/133908
PCT Pub. Date: Aug. 10, 2017

(65) Prior Publication Data
US 2019/0040971 A1 Feb. 7, 2019

(30) Foreign Application Priority Data
Feb. 1, 2016 (DE) .................. 10 2016 101 722

(51) Int. Cl.
*F16K 31/06* (2006.01)
*F16K 31/126* (2006.01)
(Continued)

(52) U.S. Cl.
CPC ........ *F16K 31/0658* (2013.01); *F16K 31/046* (2013.01); *F16K 31/082* (2013.01);
(Continued)

(58) Field of Classification Search
CPC .............. F16K 31/0658; F16K 31/046; F16K 31/1262; F16K 31/04; F16K 31/126;
(Continued)

(56) References Cited

U.S. PATENT DOCUMENTS 2,201,946 A * 5/1940 Krogh .................... F27D 19/00
432/24
4,254,935 A * 3/1981 Jarrett .................. H01F 7/1653
251/129.1
(Continued)

FOREIGN PATENT DOCUMENTS

DE 2442587 B1 4/1975
GB 2455569 A 6/2009
(Continued)

OTHER PUBLICATIONS

English Translation of International Preliminary Report, dated May 17, 2018.
(Continued)

*Primary Examiner* — John Bastianelli
(74) *Attorney, Agent, or Firm* — Lucas & Mercanti, LLP (57) ABSTRACT

A control valve for adjusting the cross-sectional area of flow in at least one pipe, in particular for highly dynamic control of the coolant volume for cooling sections in rolling mills, includes a valve body, at least one valve seat and a positioning actuator configured for modifying the position of the valve body. The positioning actuator includes a linear electric motor in order to achieve reproducible response behavior, short response times and high positioning precision of the control valve.

10 Claims, 6 Drawing Sheets

(51) Int. Cl.
*F16K 31/04* (2006.01)
*F16K 31/08* (2006.01)
*H01F 7/16* (2006.01)
*B21B 45/02* (2006.01)

(52) U.S. Cl.
CPC ....... *F16K 31/1262* (2013.01); *H01F 7/1615* (2013.01); *B21B 45/0203* (2013.01)

(58) Field of Classification Search
CPC ... F16K 31/082; F16K 31/08; B21B 45/0203; H01F 7/1615
USPC .................. 251/65, 118–127, 129.01–129.22
See application file for complete search history.

(56) References Cited

U.S. PATENT DOCUMENTS

| | | | |
|---|---|---|---|
| 4,387,739 A * | 6/1983 | Schaming | B21B 27/10 137/884 |
| 4,469,304 A * | 9/1984 | Kah, Jr. | F16K 31/082 251/129.04 |
| 4,733,697 A * | 3/1988 | Baun | B05B 1/3006 137/340 |
| 6,293,514 B1 * | 9/2001 | Pechoux | F16K 1/52 137/625.3 |
| 6,329,728 B1 | 12/2001 | Kitazawa | |
| 7,007,917 B2 * | 3/2006 | Choi | F16K 31/0655 251/122 |
| 7,500,834 B2 * | 3/2009 | Durward | F16L 55/26 137/15.04 |
| 8,286,935 B2 * | 10/2012 | White | E21B 34/04 251/65 |
| 10,322,440 B2 | 6/2019 | Haraguchi | |
| 2008/0191825 A1 * | 8/2008 | Wright | F01L 9/04 335/255 |

FOREIGN PATENT DOCUMENTS

| | | |
|---|---|---|
| GB | 2460336 A | 12/2009 |
| JP | S55142656 U | 10/1980 |
| JP | S56105644 U | 8/1981 |
| JP | H0250583 U | 4/1990 |
| JP | H05106752 A | 4/1993 |
| JP | H10213253 A | 8/1998 |
| JP | H11125356 A | 5/1999 |
| JP | H11270416 A | 10/1999 |
| JP | 2002005334 A | 1/2002 |
| JP | 2002031262 A | 1/2002 |
| JP | 2014054652 A | 3/2014 |
| WO | 2008092124 A2 | 7/2008 |
| WO | 2009048995 A1 | 4/2009 |

OTHER PUBLICATIONS

International Search Report dated Apr. 11, 2017 for PCT/EP2017/051232 and English translation.
CN Appln No. 201780008182.9, Office Action issued by Chinese Patent Office dated Apr. 4, 2019, 14 PAGES.
KR Appln No. 9-5-2019-085295432, Office Action issued by Korean Patent Office dated Nov. 28, 2009, 5 PAGES.

* cited by examiner

CONTROL VALVE, IN PARTICULAR FOR USE IN COOLING PATHS

CROSS-REFERENCE TO RELATED APPLICATIONS

This application is a 371 of PCT/EP2017/051232 filed Jan. 20, 2017, which in turn claims the priority of DE 10 2016 101 722.1 filed Feb. 1, 2016, the priority of both applications is hereby claimed and both applications are incorporated herein by reference.

BACKGROUND OF THE INVENTION

The invention relates to a control valve for adjusting the cross-sectional area of flow in a pipe, in particular for highly dynamic control of the cooling water volume for cooling sections in rolling mills.

A control valve is a device which operates with auxiliary power and controls flow rate in a process system.

In wire and bar stock steel rolling mills, water-cooling sections are used to influence the mechanical properties of the material. Various methods are used for this purpose:

The Tempcore method is essentially used in the production of structural steel and involves using the rolling heat to heat-treat the finished rolled product upstream of the cooling bed (bar stock steel) or the laying head (wire). The rolled stock leaves the final roll stand at a temperature of 950-1050° C. In a cooling section, the outer layer is cooled by high-pressure water (5-16 bar) to temperatures of <400° C. This results in a martensitic structure. During subsequent temperature equalization, on the one hand, the outer martensitic layer is reheated (tempered) and, on the other hand, the core is cooled thus giving rise to a ferritic/pearlitic grain structure. Using the Tempcore method makes it possible to achieve the required mechanical properties of the finished product together with a simultaneous significant reduction in the addition of alloy elements. Accurate temperature control determines the potential savings in alloy elements.

In thermomechanical rolling, the rolled stock is cooled to a defined temperature before the final shaping steps. This results in a fine grain structure which simultaneously combines high strength, good toughness and cold workability. Various forms are used: thermomechanical rolling gives rise to mechanical properties which could otherwise only be achieved by addition of alloy elements. Accurate temperature control is a prerequisite for application of thermomechanical rolling methods.

Heating of the continuous-cast billets in the reheating furnace upstream of the hot-rolling mill is never completely uniform over the length of the billet. The purpose of the reheating furnace immediately downstream of the continuous caster is to reheat the continuous-cast billets which have cooled down. Water-cooled rails on which the billets rest during heating are required to support the continuous-cast billets in the reheating furnace. Shaded areas, which are manifested as a temperature profile over the length of the billets, occur in the region of the rails. Avoiding temperature deviations over the length of the billets entails highly dynamic control of the cooling water.

Commercially available control elements for controlling the cooling water can be divided into pneumatic and electrical control elements:

Control elements with a pneumatic actuator respond in a short to moderate response time. The problem is, however, that the transition from static to sliding friction results in a stick-slip effect which results in non-reproducible response behavior and thus inconsistent response times. Pneumatic actuators are accordingly unsuitable for high-precision, dynamic control processes.

Control elements with an electrical actuator are based on a self-locking geared motor unit with short response times and high positioning precision but excessively low positioning speeds.

While what is currently the fastest valve actuator on the market with a positioning speed of at most 10 mm/s does indeed achieve the required response time, it cannot however achieve the required positioning speed (50 mm/s).

It is therefore not currently possible to ensure accurate temperature control with minimum deviations in temperature from the target temperature downstream of the cooling section. Such temperature control can, however, be achieved according to the invention by highly dynamic control of the cooling water volume in conjunction with a suitable control element for controlling the cooling water.

BRIEF SUMMARY OF THE INVENTION

On the basis of this prior art, the object of the invention is to propose a control element for adjusting the cross-sectional area of flow in a pipe, in particular for highly dynamic control of the cooling water volume for cooling sections in rolling mills, which has reproducible response behavior, short response times and high positioning precision.

Said object is achieved in a control valve of the above-mentioned kind by the positioning actuator having a linear electric motor.

The invention in particular relates to a control valve comprising
- a valve body (valve housing),
- at least one guided closure member,
- at least one valve seat, wherein each closure member interacts with at least one valve seat and
- a positioning actuator configured for modifying the position of each closure member in the valve body.

The control valve can take the form of a single seat control valve or a multi-seat control valve, in particular a double seat control valve. Positioning forces can be reduced by the use of multi-seat control valves.

According to an embodiment of the invention, the control valve is a multi-way control valve in order to mix or divide material streams.

The geometric shape of each closure member determines the flow characteristic. The pressure, temperature or also flow rate of the medium itself can also be controlled with the variable flow rate.

Materials which are for example used for control valves are gray cast iron, brass, cast steel, special steel or plastics.

The control valve can be installed in the pipe or pipework system in various manners. Welding, clamping or preferably flange connection can, for example, be considered.

According to an embodiment of the invention, the linear motor displaces the closure member(s) of the control valve in a guided translational movement. As a direct drive, the linear motor allows a translational movement to be directly produced with differing forces and/or speeds. The linear motor has a short response time combined with high positioning speed and high positioning precision, wherein the response time is additionally reproducible. A control valve with such a positioning actuator is ideally suited to the highly dynamic control of the cooling water volume for cooling sections in rolling mills.

The linear motor comprises an energized primary part and a reactive or secondary part. According to various embodiments of the invention, the linear motor is a synchronous linear motor or an asynchronous, stepper or direct current linear motor.

The permanent magnets of the synchronous linear motor, which is the most frequently used type, preferably interact with a stationary primary part. In particular, no moved lines are required to supply power to the synchronous linear motor.

The permanent magnet unit is structurally advantageously preferably arranged directly on an actuating element for each closure member. The positioning precision of the positioning actuator can be further increased in this manner, since no transmission elements affected by backlash are provided between the positioning actuator and the closure member directly connected to the actuating element.

As a preferred embodiment, the permanent magnet unit takes the form of an integral part of the rod-shaped actuating element. As part of the linear drive, the rod-shaped actuating element carries out a translational movement in order to move the closure member to and fro.

A position regulator for the linear motor is provided in order to permit accurate adjustment of the control valve despite fluctuations in the pressure and volume of the cooling medium controlled by the control valve. Despite the low inert mass of the linear motor, the position regulator contributes to the desired high positioning precision even in the event of fluctuations in pressure and volume of the controlled cooling medium.

A positioning actuator according to the invention exhibits, for example, the following technical data:

Positioning Force:
Small version (DN100, 10 bar water pressure): 3 kN
Large version (DN300, 15 bar water pressure): 40 kN
Stroke:
20-150 mm
Positioning Speed:
At least 50 mm/s, preferably 150 mm/s
Positioning Precision:
0.05 mm
Response Time:
t≤0.1 sec In one advantageous embodiment of the invention, the positioning actuator additionally comprises a diaphragm actuator with a diaphragm, at least one first side of which can be placed under load by a pressure medium. The linear motor absorbs the very high peak force for opening the control valve, which force is subsequently at least in part absorbed by the diaphragm actuator. If the first side of the diaphragm actuator is placed under load by a pressure medium and the second side of the diaphragm by at least one spring, the control valve can be automatically closed or opened in the event of a failure of power supply to the linear motor. Alternatively, the pneumatic actuator can take the form of a diaphragm, each side of which can be individually placed under load by pressure medium.

The additional diaphragm actuator is structurally advantageously integrated in the positioning actuator by the diaphragm being attached to the upper end of the rod-shaped actuating element.

BRIEF DESCRIPTION OF THE DRAWINGS

A control valve according to the invention is explained in greater detail below with reference to the figures, in which.

DETAILED DESCRIPTION OF THE PREFERRED EMBODIMENTS

The control valve (1) comprises a valve housing (2) with an inlet and outlet (2a, 2b), a closure member (3) and a valve seat (4). The valve stem (4a) connected to the closure member (3) is coupled outside the valve housing (2) with a rod-shaped actuating element (5). The actuating element (5) is guided in an actuator housing (6) for translational to and fro movement in a vertical direction in order to move the closure member (3) coupled with the actuating element (5) to and fro between a closed position shown in FIG. 1 and an open position.

Figure 1:
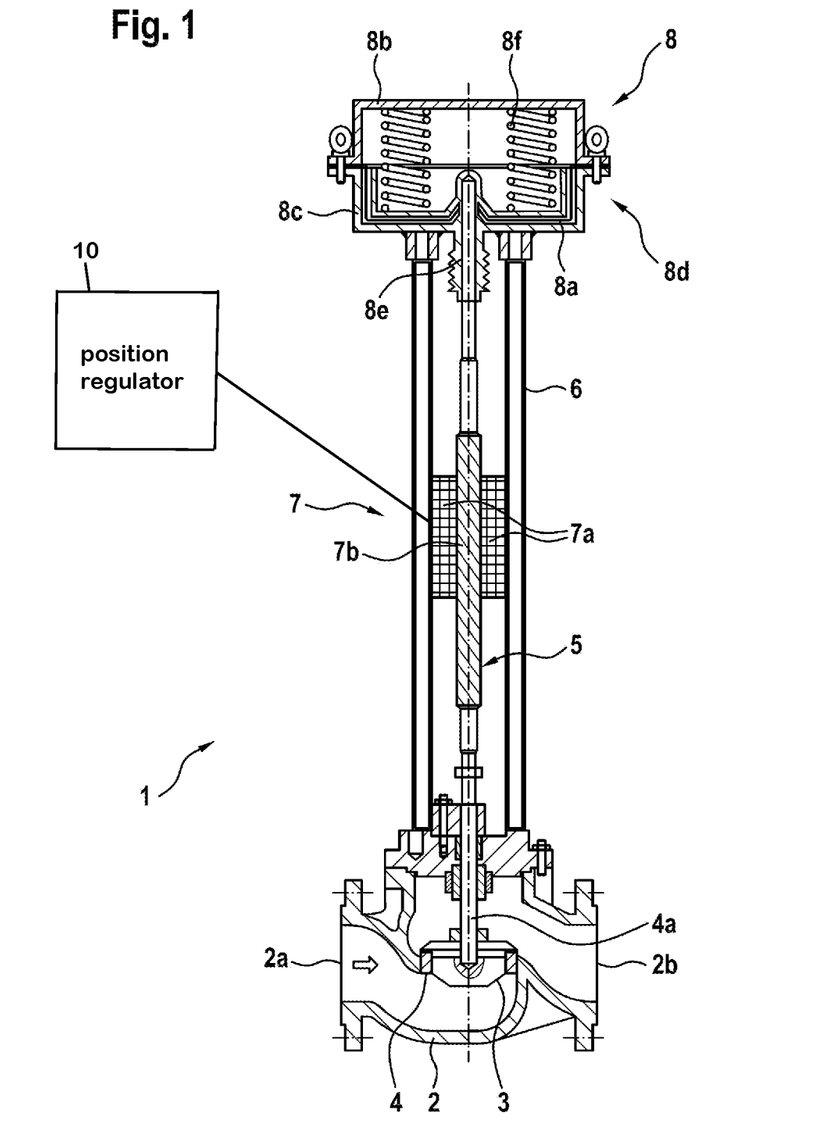
FIG. 1 shows a control valve according to the invention with linear motor.
Figure 2A:
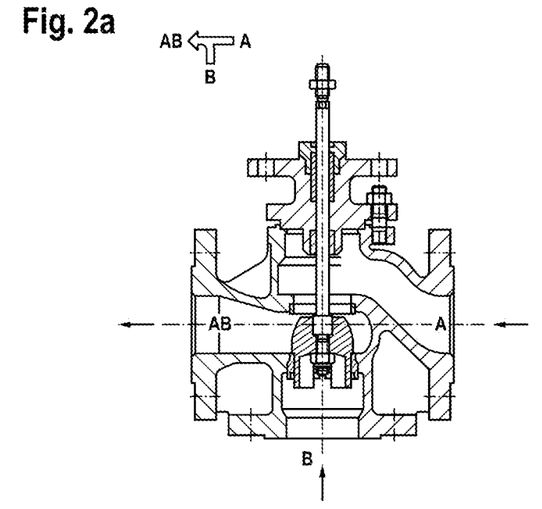
FIGS. 2A-D show various valve housings for a control valve with linear motor and FIGS. 3A-F show different embodiments of closure members for a control valve with linear motor.
Figure 2B:
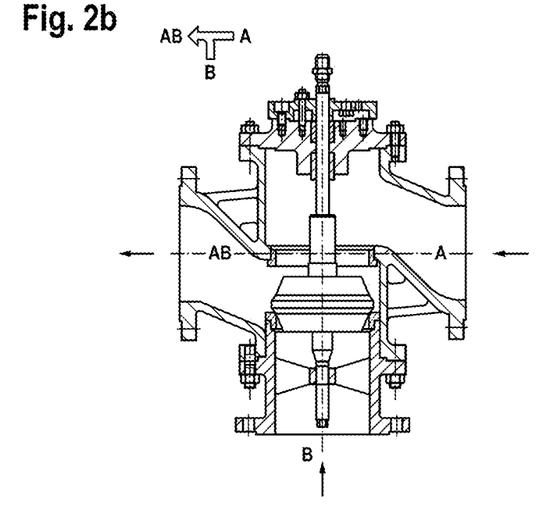
Figure 2C:
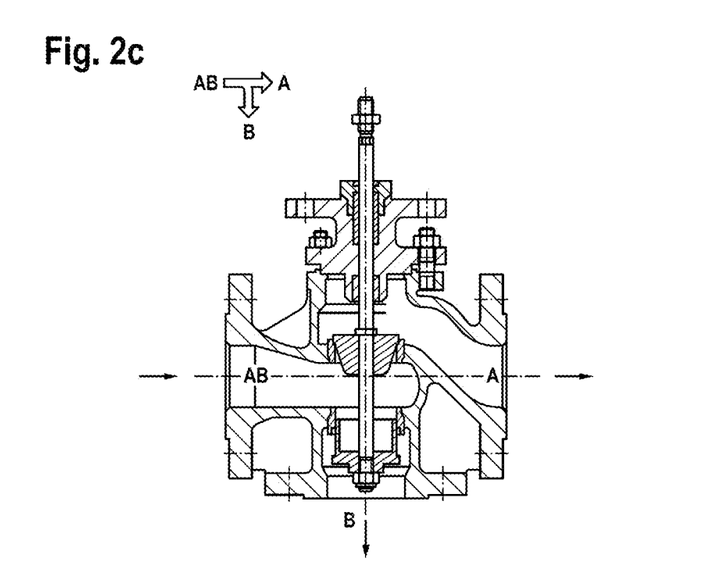
Figure 2D:
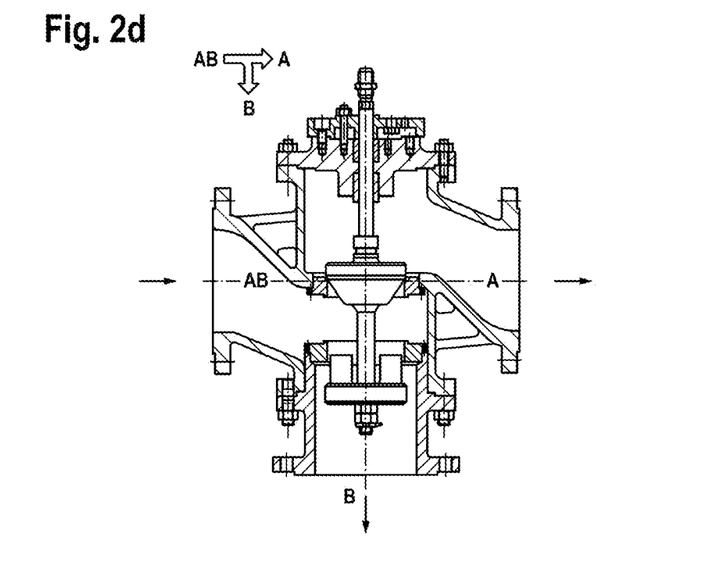

The downwardly tapering closure member (3) is constructed such that, in the closed position, it prevents flow between the closure member (3) and the valve seat (4). Raising the downwardly tapering closure member (3) creates an annular cross-sectional area of flow between the valve seat (4) and the closure member (3), which area, due to the cross-sectional shape of the closure member, becomes larger during movement into the fully open position.

The positioning actuator (7, 8) comprises a linear motor (7) and a diaphragm actuator (8). The linear motor (7) is formed by a coil unit (7a) arranged stationarily in the actuator housing (6) and a permanent magnet unit (7b). The permanent magnet unit (7b) takes the form of an integral part of, namely a portion of, the rod-shaped actuating element (5). A position reoulator (10), i.e., position control means, for the linear motor (7) is provided in order to permit accurate adjustment of the control valve (1) despite fluctuations in the pressure and volume of the cooling medium controlled by the control valve.

The diaphragm actuator (8) placed on and attached to the actuator housing (6) comprises a diaphragm (8a) which is clamped between the housing halves (8b, 8c) of the diaphragm housing (8d). The upper end of the rod-shaped actuating element (5) is guided into the diaphragm housing via a gas-tight bushing (8e) and attached centrally to the diaphragm (8a). The diaphragm (8a) can be placed under load from below with a pressure medium. The upper side of the diaphragm is loaded by springs (8f) which rest against the upper housing half (8b).

The springs (8f) ensure that, in the event of a pressure drop in the lower chamber of the diaphragm actuator (8), the diaphragm (8a) is loaded in the closing direction of the control valve (1).

FIGS. 2a to 2d show different embodiments of valve housings which are intended for three-way control valves. The embodiments according to FIGS. 2a and 2b in each case have a closure member which interacts with two valve seats. The embodiments according to FIGS. 2c and 2d have two closure members, each of which interacts with one valve seat.

It should be noted that various embodiments of control valves merely distinctly reduce, but do not prevent, flow in the closed position. This amounts to a leakage volume which can very well be of the order of 10% of the nominal flow rate.

Figure 3A:
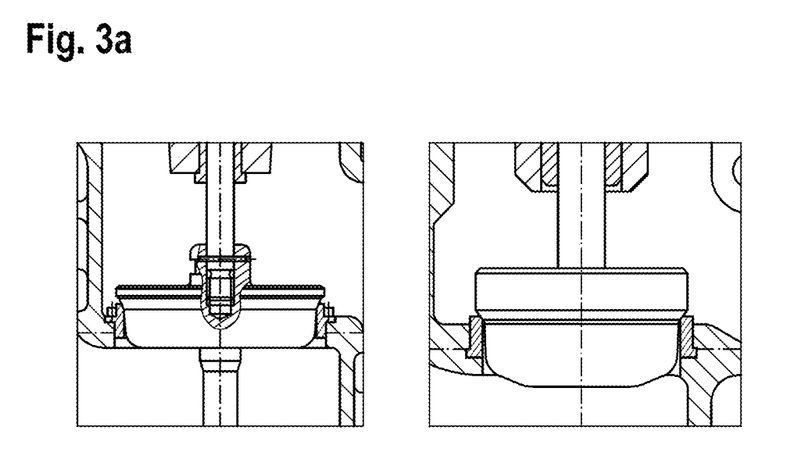
Figure 3B:
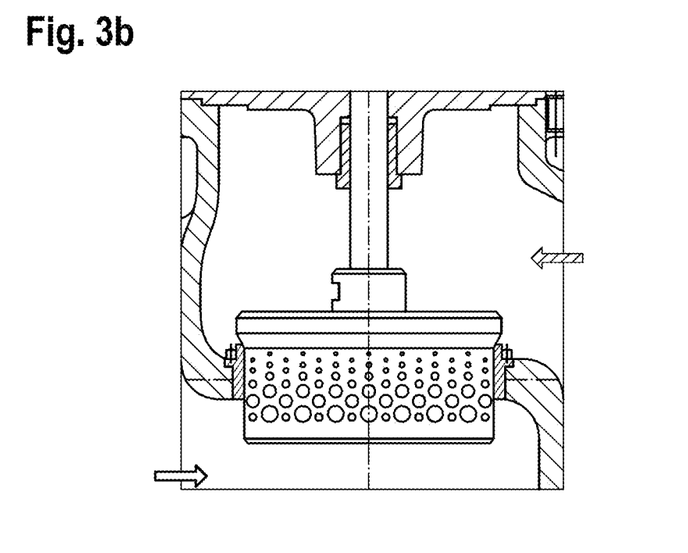
Figure 3C:
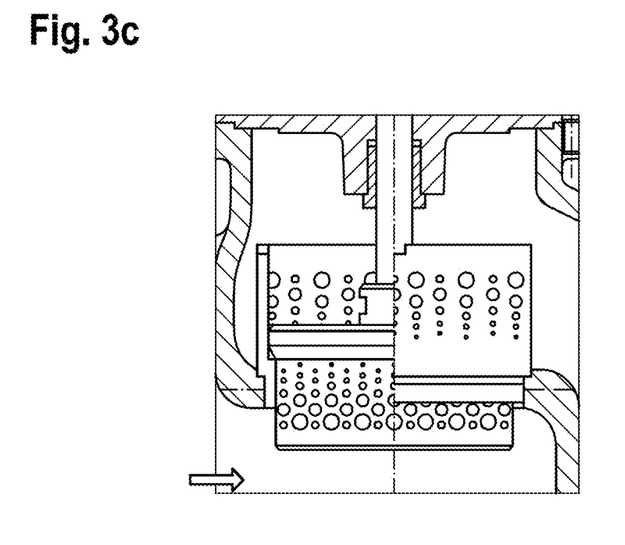
Figure 3D:
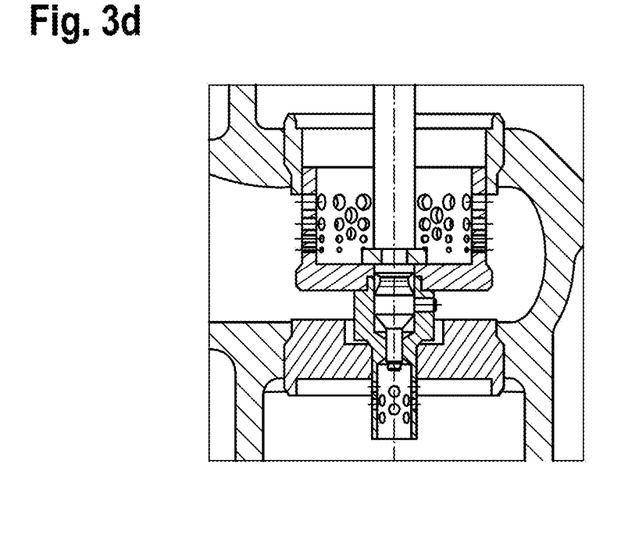
Figure 3E:
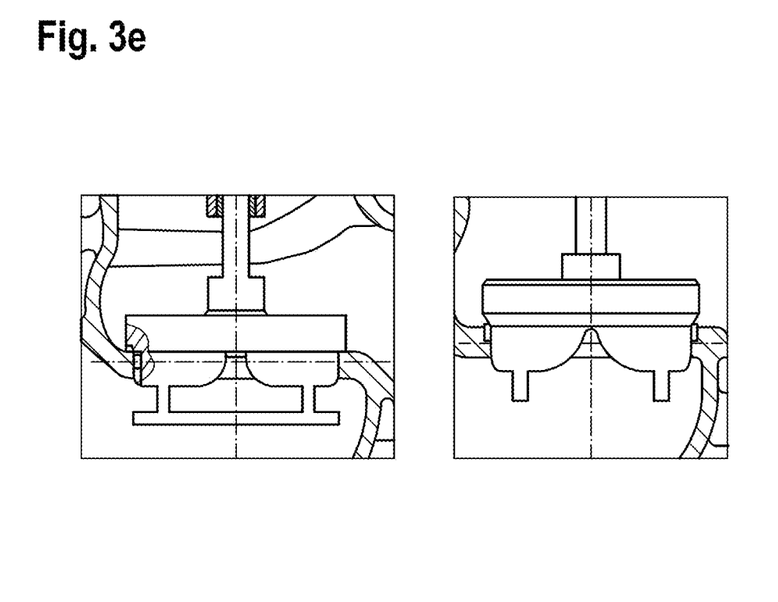
Figure 3F:
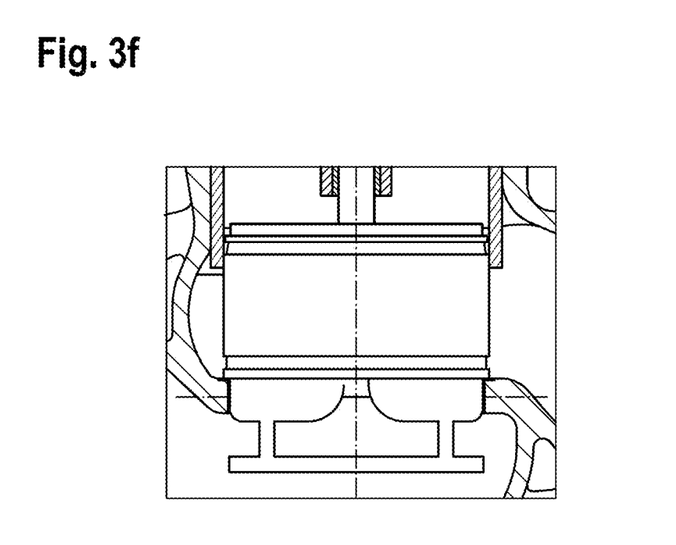

FIGS. 3a-3f show different embodiments of the closure members which influence the flow characteristic. FIG. 3a shows a closure member in the form of a parabolic plug, FIG. 3b in the form of a perforated plug, FIG. 3c in the form of a perforated plug with perforated cage, FIG. 3d in the form of a perforated plug for a control valve of three-way design, FIG. 3e in the form of a lantern plug and FIG. 3f in the form of a lantern plug with pressure relief means.

| No. | Description |
|---|---|
| 1. | Control valve |
| 2. | Valve housing |
| 2a. | Inlet |
| 2b. | Outlet |
| 3. | Closure member |
| 4. | Valve seat |
| 4a. | Valve stem |
| 5. | Actuating element |
| 6. | Actuator housing |
| 7. | Positioning actuator |
| 7a. | Coil unit |
| 7b. | Permanent magnet unit |
| 8. | Diaphragm actuator |
| 8a. | Diaphragm |
| 8b, c. | Housing halves |
| 8d. | Diaphragm housing |
| 8e. | Bushing |
| 8f. | Springs |

The invention claimed is:

1. A control valve for adjusting a cross-sectional area of flow in a pipe, the control valve comprising:
a valve body, wherein a geometric shape of the valve body determines a flow characteristic of the control valve;
a valve seat; and
a positioning actuator configure to modify a position of the valve body, the positioning actuator including a synchronus linear electric motor and a rod-shaped actuating element directly connected to the valve body without any intermediate couplings,
the synchronous linear electric motor having a coil and a permanent magnet, the coil being stationarily disposed, the permanent magnet being disposed on the actuating element, wherein the permanent magnet is a portion of the rod-shaped actuating element,
the positioning actuator further comprising a position regulator for the synchronous linear electric motor permitting accurate adjustment of the control valve in response to fluctuations in pressure and volume of a flow medium in the control valve.

2. The control valve as claimed in claim 1, wherein the rod-shaped actuating element is movable along a translational movement.

3. The control valve as claimed in claim 1, wherein the position actuator includes a diaphragm actuator with a diaphragm having a first side placeable under load by a pressure medium.

4. The control valve as claimed in claim 3, wherein the diaphragm is attached to an upper end of the rod-shaped actuating element.

5. The control valve as claimed hi claim 3, further comprising a spring having a force directed onto a second side of the diaphragm such that the second side of the diaphragm is spring-loaded by the spring.

6. A cooling section for a rolling mill comprising a pipe for guiding a liquid coolant, and a control valve as claimed in claim 1 arranged in the pipe for controlling a flow of liquid coolant through the pipe.

7. A control valve for adjusting a cross-sectional area of flow in a pipe, the control valve comprising:
a valve body, wherein a geometric shape of the valve body determines a flow characteristic of the control valve;
a valve seat; and
a positioning actuator configured to modify a position of the valve body, the positioning actuator including a synchronous linear electric motor and a rod-shaped actuating element directly connected to the valve body,
the synchronous linear electric motor having a coil and a permanent magnet, the coil being stationarily disposed, the permanent magnet being disposed on the actuating element as an integral part of the actuating element,
the positioning actuator further comprising a position regulator for the synchronous linear electric motor permitting accurate adjustment of the control valve in response to fluctuations in pressure and volume of a flow medium in the control valve,
wherein the position actuator further includes a diaphragm actuator with a diaphragm having a first side placeable under load by a pressure medium.

8. The control valve as claimed in claim 7, wherein the rod-shaped actuating element is movable along a translational movement.

9. The control valve as claimed in claim 7, wherein the diaphragm attached to an upper end of the rod-shaped actuating element.

10. The control valve as claimed in claim 7, further comprising a spring having a force directed onto a second side of the diaphragm such that the second side of the diaphragm is spring-loaded by the spring.

* * * * *